United States Patent
Proehl

(10) Patent No.: US 7,398,066 B2
(45) Date of Patent: Jul. 8, 2008

(54) COMMUNICATION SYSTEM CONTROL USING RELIABILITY DATA

(75) Inventor: Gregory Proehl, Woodstock, IL (US)

(73) Assignee: STMicroelectronics, Inc., Carrollton, TX (US)

( * ) Notice: Subject to any disclaimer, the term of this patent is extended or adjusted under 35 U.S.C. 154(b) by 476 days.

(21) Appl. No.: 10/999,700

(22) Filed: Nov. 30, 2004

(65) Prior Publication Data

US 2006/0116096 A1    Jun. 1, 2006

(51) Int. Cl.
*H04B 17/02* (2006.01)
(52) U.S. Cl. .............. 455/136; 455/232.1; 455/127.2; 455/138; 455/239.1
(58) Field of Classification Search .......... 455/136, 455/232.1, 234.1, 70, 127.2, 138, 239.1
See application file for complete search history.

(56) References Cited

U.S. PATENT DOCUMENTS

| | | | | |
|---|---|---|---|---|
| 5,721,756 A | * | 2/1998 | Liebetreu et al. | ............ 375/344 |
| 6,052,566 A | * | 4/2000 | Abramsky et al. | ........ 455/67.11 |
| 6,070,062 A | * | 5/2000 | Yoshida et al. | ............ 455/234.1 |
| 6,334,218 B1 | * | 12/2001 | Jeong et al. | ................... 725/72 |
| 6,650,878 B1 | * | 11/2003 | Abe et al. | ............... 455/232.1 |
| 6,792,055 B1 | * | 9/2004 | Hart | ............................ 375/345 |
| 2006/0135081 A1 | * | 6/2006 | Mysore et al. | ............... 455/70 |

OTHER PUBLICATIONS

Closing in on the Perfect Code, Erico Guizzo, IEEE Spectrum, vol. 41, Issue 3, (Mar. 2004), pp. 36-42.

* cited by examiner

*Primary Examiner*—Sanh D. Phu
(74) *Attorney, Agent, or Firm*—Lisa K. Jorgenson; Renee Michelle Leveque

(57) ABSTRACT

A method and apparatus for recovering a data symbol from a communication signal in which the communication signal is processed to produce a baseband waveform that is then sampled to obtain a channel sequence. The channel sequence is decoded to obtain an estimate of the data symbol together with a measure of the reliability of the data symbol. The processing of the communication signal is adjusted dependent upon the measure of the reliability of the data symbol. This abstract is not to be considered limiting, since other embodiments may deviate from the features described in this abstract.

15 Claims, 4 Drawing Sheets

COMMUNICATION SYSTEM CONTROL USING RELIABILITY DATA

FIELD

This invention relates generally to the field of data communication. More particularly, this invention relates to the use of reliability data from a communication signal decoder to control a communication system.

BACKGROUND

In a communication system, the data to be transmitted is typically broken into symbols and each symbol is combined with additional information (such as parity bits) to form a code word. The process of transforming original data sequences into structured sequences better suited to transmission is called channel coding. The information in the code word is used for error checking and, sometimes, for error correction. The resulting sequence of code words is transmitted over an analog communication channel to a receiver, where an attempt is made to recover the original data symbols from the code words in a decoder. In the simplest decoders, the additional information is used to decide of the decode data is correct or not, and may be used to request that the data be resent if incorrect. More sophisticated communication systems use Forward Error Correction (FEC), where the additional information in the code word is used in an attempt to correct errors in the decoded data symbols.

A simple method for reducing bit errors in a communication system to increase the analog signal level. However, while higher signal levels are more robust to noise interference, the use of higher gain increases the power consumption of the system. Consequently, communication systems often incorporate an automatic gain control (AGC) circuit. The purpose of the AGC circuit is control the level of the analog signals in the transmitter or receiver of the communication system. A typical AGC circuit monitors a property of the analog signal after gain has been applied in amplifier and adjusts the gain based upon a predetermined criterion. For example, the power of the signal or the envelope of the signal may be monitored. One problem with this approach is that the AGC system itself also consumes power. A further disadvantage is the need for circuitry to measure the power or envelope of the amplified signal.

SUMMARY

The present invention relates generally to a communication system. Objects and features of the invention will become apparent to those of ordinary skill in the art upon consideration of the following detailed description of the invention.

One embodiment consistent with the invention relates to a method and apparatus for recovering a data symbol from a communication signal. The communication signal is processed to produce a baseband waveform that is then sampled to obtain a channel sequence. The channel sequence is decoded to obtain an estimate of the data symbol, together with a measure of the reliability of the data symbol. The processing of the communication signal is adjusted dependent upon the measure of the reliability of the data symbol.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
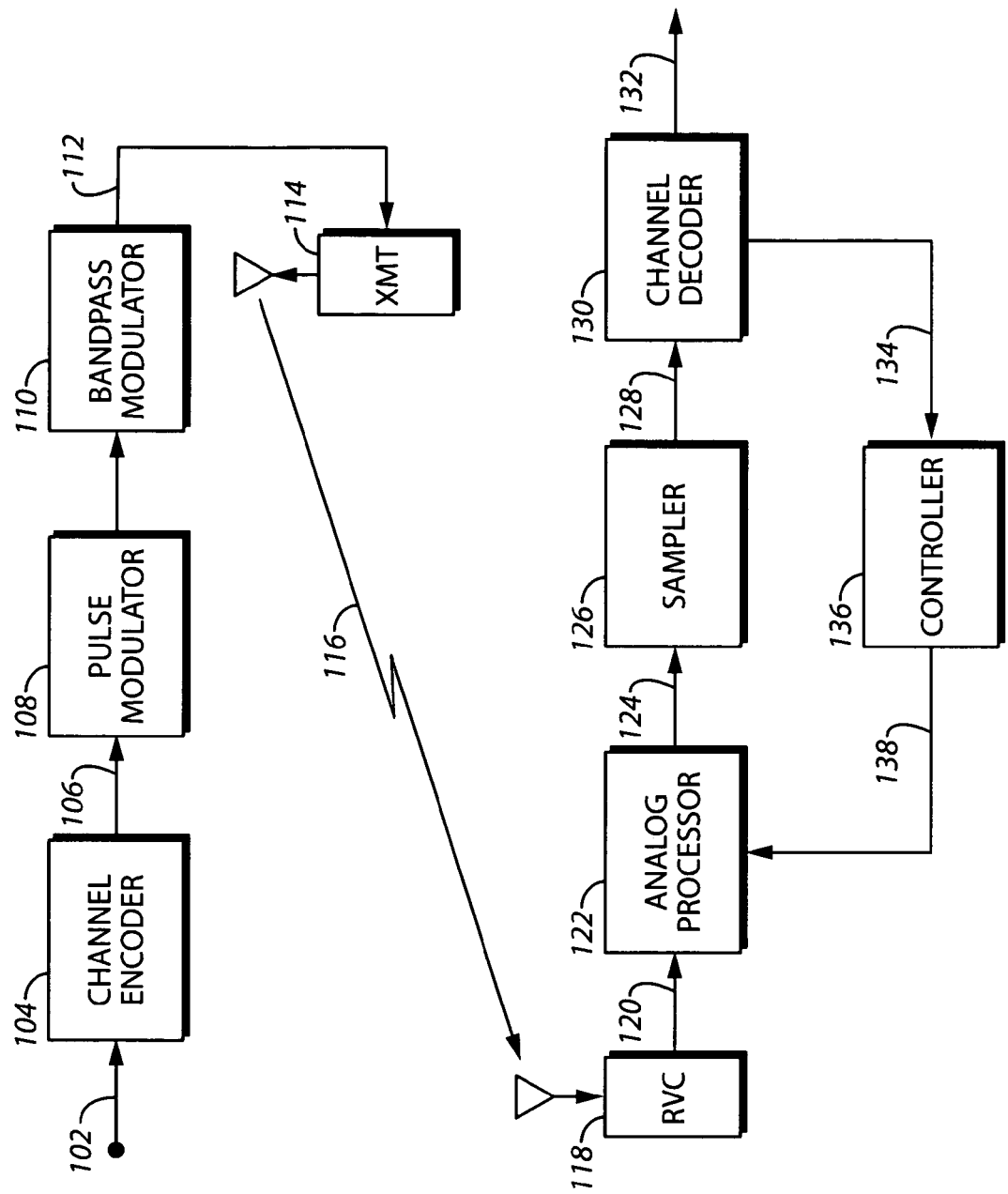
FIG. 1 is a diagrammatic representation of a communication system consistent with certain embodiments of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

FIG. 1 is a diagrammatic representation of a communication system consistent with certain aspects of the present invention. Referring to FIG. 1, a data symbol 102, which comprises a sequence of data bits to be transmitted over the communication system, is passed to a channel encoder 104. The channel encoder 104 encodes the data symbol 102 as a code word 106. The code word 106 includes additional information bits that are used by a receiver for error checking and possibly for error correction. The additional information bits may include a permuted copy of the data symbol and parity bits, for example. The code word 106 is passed to pulse modulator 108, where the digital data is converted to a baseband analog waveform, and then to bandpass modulator 110, where the baseband analog waveform is conditioned as an output bandpass modulated waveform 112 for transmission over a communication channel. Finally, the output bandpass modulated waveform 112 is transmitted by transmitter 114 over a communication channel 116. The communication channel 116 may be a radio, microwave, electrical or optical channel, for example.

The bandpass modulated waveform is received by receiver 118, along with any interfering signals, to generate an input waveform 120. The receiver may be an antenna for example. This input waveform 120 is processed in analog processor 122 to produce a baseband waveform 124, which is then sampled by an analog-to-digital converter or sampler 126 to give a channel sequence 128. The channel sequence 128 is a sequence of digital values relating to the level of the baseband waveform 124 at sampling times. The levels need not be quantized to one bit. The channel sequence 128 is decoded by channel decoder 130 to produce an estimate 132 of the original data symbol.

The channel decoder 130 may use Forward Error Correction (FEC) techniques, in which the additional information transmitted in the code word is used to correct errors in the decoded data symbol. As part of the FEC process, the decoder may calculate the reliability of each bit in the data symbol, in addition to estimating the value of each bit. The reliability may be the probability or likelihood that a bit takes a particular value. In addition, the likelihood that decoded data symbol is correct may be estimated by looking at the reliability of the parity bits and parity of the decoded data symbol. The various reliability estimates generated by the channel decoder 130 are represented by a reliability vector 134 in FIG. 1. The reliability vector 134 is used in a controller 136 to generate one or more control signals 138 that are used to adjust various characteristics, such as an amplifier gain or a frequency response of a filter, of the analog processor 122.

Figure 2:
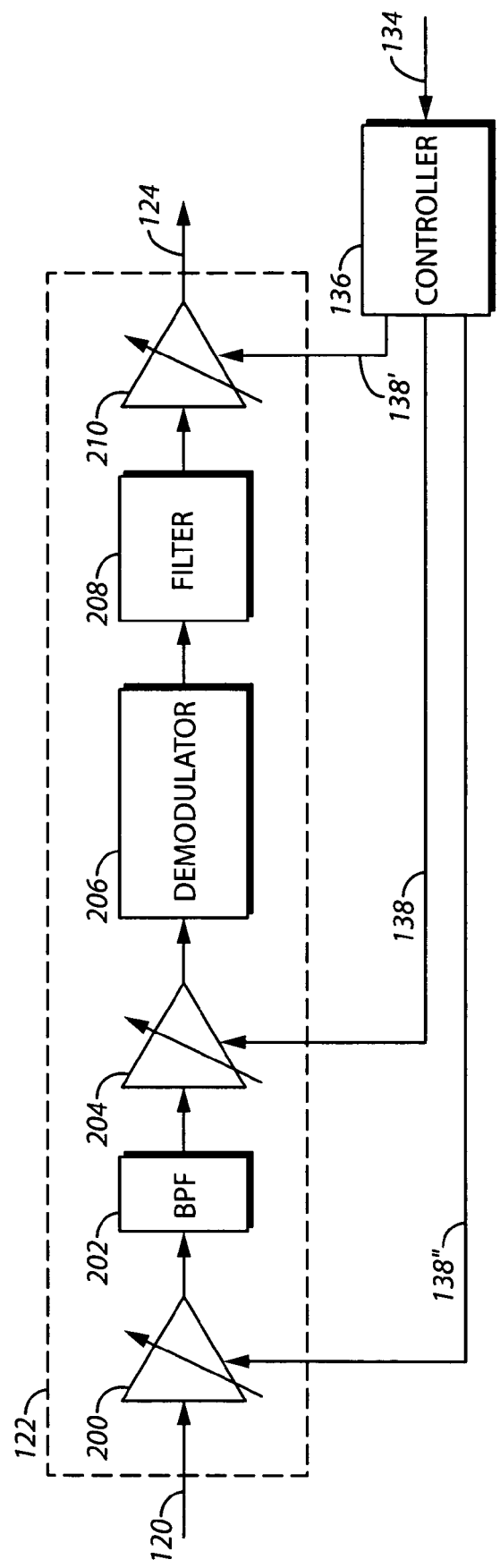
FIG. 2 is a further diagrammatic representation of a communication system consistent with certain embodiments of the present invention.

FIG. 2 is a diagrammatic representation of a controller 136 and analog processor 122 of a communication system consistent with certain aspects of the present invention. Referring to FIG. 2, an input waveform 120 is received by analog processor 122. In the exemplary analog processor shown in FIG. 2, the input waveform 120 is passed though a first amplifier 200 and a filter 202. Filter 202 may be a bandpass filter, used to reduce interference from other communication channels and produce an input bandpass modulated waveform. This waveform is amplified by a second amplifier 204 before being demodulated in demodulator 206. The demodulated signal is filtered in a filter 208 and amplified in a third amplifier 210 to produce the baseband waveform 124. In this embodiment of the invention, the reliability vector 134 associated with the received data symbol is used in a controller 136 to generate a first control signal 138" that is used to adjust the gain of the first amplifier 200, a second control signal 138 that is used to adjust the gain of the second amplifier 204 and a third a second control signal 138' that is used to adjust the gain of the third amplifier 210. Other embodiments may use a different number of amplifiers and any number of the amplifiers may be adjusted. If the reliability vector 134 indicates a low confidence in the decoded data symbol, one or more of the amplifier gains may be increased to improve reliability. If the reliability vector 134 indicates a very high confidence in the decoded data, one or more of the amplifier gains may be decreased to reduce power consumption. In a further example, one or more of the amplifier gains is increased when an error is suspected or detected in the data symbol. In other embodiments of the invention, a frequency characteristic, such as the center frequency or bandwidth for example, of the filter 202 or the filter 208 is adjusted dependent upon the reliability vector 134. In a still further embodiment, the orientation of an antenna in the receiver is adjusted dependent upon the reliability vector 134. For example, if the reliability of the data symbol is low, the antenna in a first direction, if this does not improve the reliability, the antenna is turned in a second direction. This process continues until the reliability is at a desired level.

The use of information already calculated in the FEC for controlling aspects of the communication system alleviates the need for extra circuitry or microprocessor power to perform the task. In addition, use of information already calculated in the FEC ties the control of the system to overall output (the decoded data symbol) rather than to some intermediate signal level. One benefit of this approach is that power consumption can be optimized.

An example of a communication system that uses Forward Error Correction (FEC) is a communication system that uses turbo codes to encode the data. When data is transmitted over a communication system using turbo-codes, the coder encodes both the original data string and a permutation of the original data string, along with parity bits. The corresponding turbo-decoder uses a Forward Error Correction technique in which the original and permuted data strings are operated on to calculate of set of probabilities for bits in the data strings (and the bits of the additional information). One decoder is used for the original data and one for the permuted data. Soft decisions (likelihoods) from the output of one decoder are passed to the input of the other decoder. In addition, the turbo-decoder also counts on "clues" that help it estimate whether a received bit is a 0 or a 1. First, it inspects the analog signal level of the received bits. While many decoding schemes transform the received signal into either a 0 or a 1—therefore throwing away valuable information, because the analog signal has fluctuations that can tell us more about each bit—a turbo decoder transforms the signal into integers that measure how confident we can be that a bit is a 0 or a 1. In addition, the decoder looks at its parity bits, which tell it whether the received data seems intact or has errors.

By way of example, the coding and decoding of the five-bit data symbol given in Table 1 will now be described.

TABLE 1

| 0 | 1 | 1 | 0 | 1 |
|---|---|---|---|---|

The data is transformed to the scrambled and encoded data given in Table 2.

TABLE 2

| −6 | 5 | 7 | −2 | 6 |
|---|---|---|---|---|
| −5 | 3 | 7 | −6 | 5 |
| −3 | 4 | 2 | −4 | 3 |

This data is converted to an analog signal and transmitted to a receiver. At the receiver, the encoded data is recovered, but is subject to error. For example, an error in the upper right value might result in the sequence of data shown in Table 3 being received.

TABLE 3

| −6 | 5 | 7 | −2 | −2 |
|---|---|---|---|---|
| −5 | 3 | 7 | −6 | 5 |
| −3 | 4 | 2 | −4 | 3 |

This sequence of data is analyzed in a Forward Error Corrector, and the (scaled) probability of a bit being a one or zero is shown in Table 4.

TABLE 4

| −14 | 12 | 16 | −12 | 6 |
|---|---|---|---|---|

The integer values in Table 4 denote the scaled probabilities with large positive values being almost certainly a 'one' and large negative values being almost certainly a 'zero'. That is, a larger number (positive or negative) denotes a higher confidence or reliability in the decoded value. In this example the reliability vector is $r=\{-14, 12, 16, -12, 6\}^T$, where the superposed T denotes the transpose. The final decoded data symbol is given in Table 5, which is the correct data symbol as originally transmitted.

TABLE 5

| 0 | 1 | 1 | 0 | 1 |
|---|---|---|---|---|

The values in Table 4 are usually discarded, but contain some useful information. In particular, the table shows that the last bit is more likely to be an error, since its probability value is closer to zero compared to other bits in the string. In accordance with one aspect of the present invention, this information can be used in a feedback mechanism to control certain aspects of the communication system.

Figure 3:
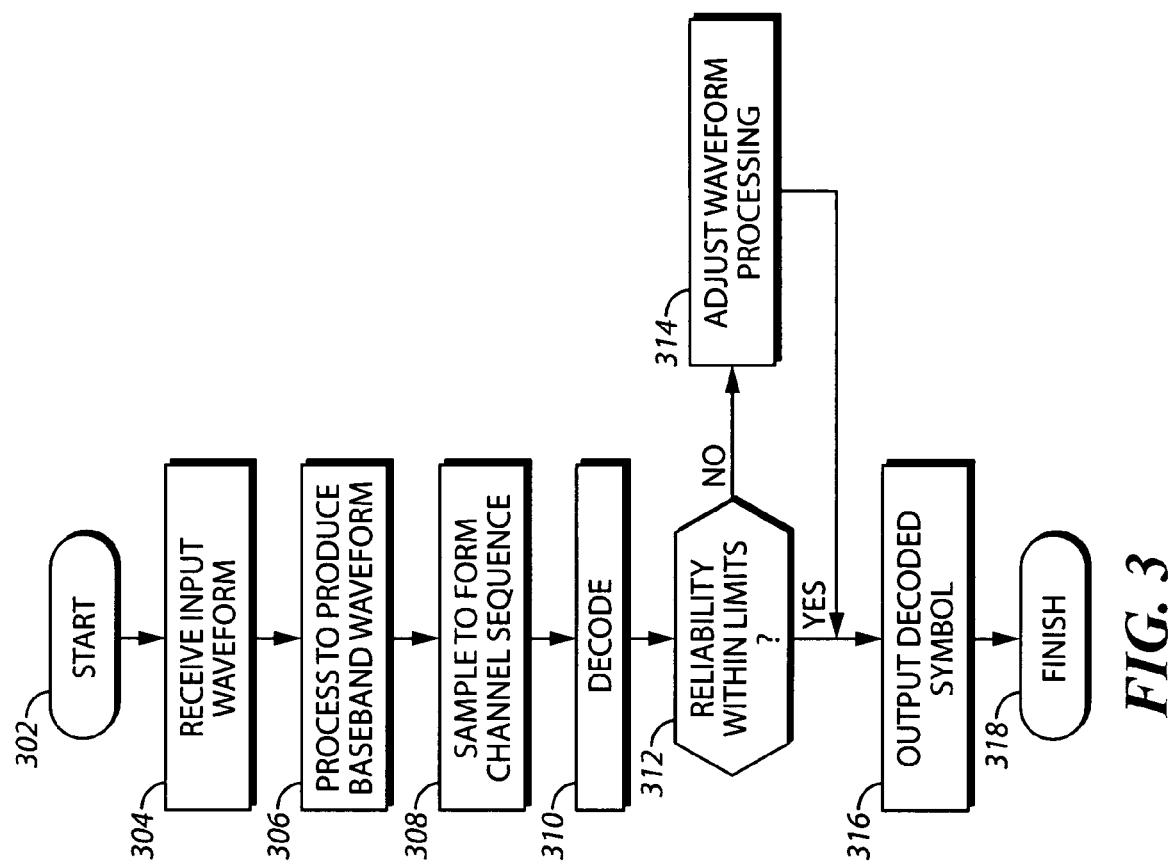
FIG. 3 is a flow chart of a method consistent with certain embodiments of the present invention.

FIG. 3 is a flow chart of a method for recovering a data symbol from a communication signal in accordance with certain aspects of the invention. Referring to FIG. 3, following start block 302, an input waveform is received at block 304. The input waveform may be produced by using an antenna to convert a radio signal into an electrical signal, for example. At block 306, the input waveform is processed to obtain a baseband waveform, which is then sampled at block 308 to yield a channel sequence. The processing may include filtering, amplification and demodulation. The channel sequence is decoded at block 310 to produce an estimate of the data symbol and a measure of the reliability of the data symbol. At decision block 312, the reliability of the estimate of the data symbol is checked to determine if the reliability is within predetermined limits. If the reliability is not within the predetermined limits, as indicated by the negative branch from decision block 312, the processing of the input waveform is adjusted dependent upon the reliability of the data symbol. For example, a gain may be increased if the reliability is too low or increased if the reliability is too high. Flow then continues to block 316 where the decoded symbol is output, together with an indication of its reliability. The decoded symbol may not be outputted if it is judged to be incorrect or have low reliability. The decoding of the symbol is complete, and the method terminates at block 318.

In one embodiment of the invention, the gain is adjusted to minimize the difference between the elements of the reliability vector r and a predetermined target value, R, say. The new gain $G_{new}$ is adjusted from the old gain $G_{old}$ according to the equation $$G_{new}=G_{old}-k(|r_i|-R),$$

where $r_i$ is the $i^{th}$ element of the reliability vector, r, and $i=_i^{arg} max\{||r_i|-R|\}$. That is, i is the index of the element of reliability vector furthest from the predetermine target value, R. The value of the parameter k controls how fast the gain adjustment responds to changes in the reliability vector, r. The adjustment may be calculated by the same processor that performs the decoding function, or may be calculated using a separate circuit.

Figure 4:
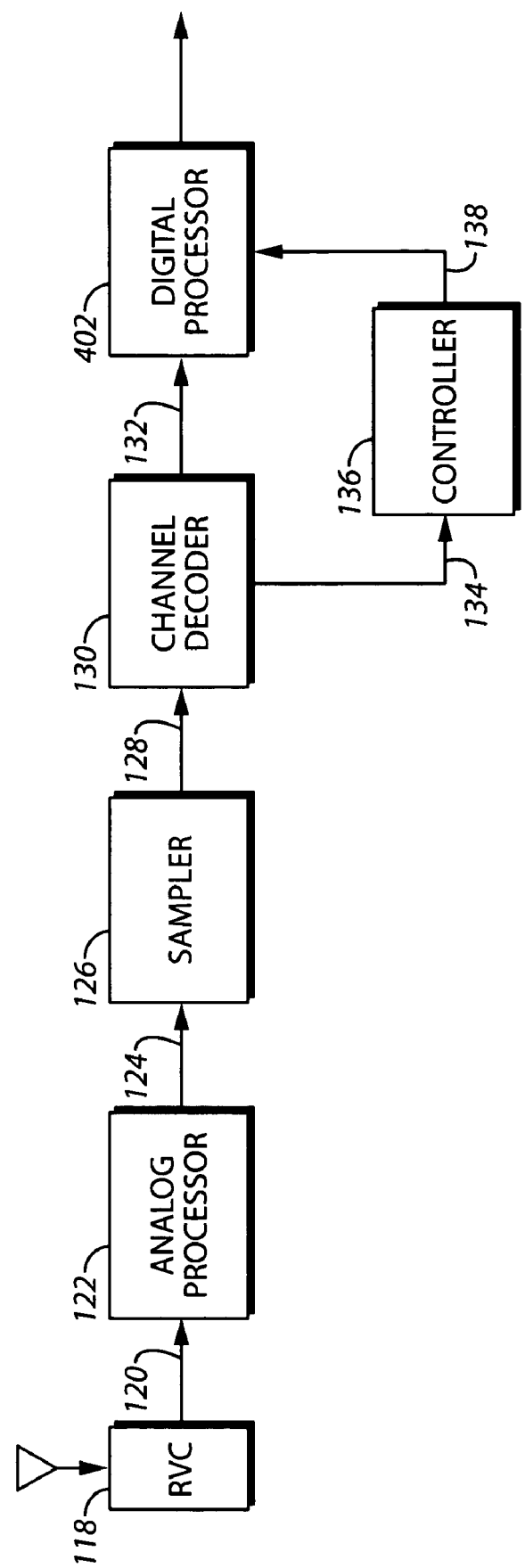
FIG. 4 is a diagrammatic representation of a communication system consistent with certain embodiments of the present invention.

FIG. 4 is a diagrammatic representation of a communication system consistent with certain embodiments of the present invention. Referring to FIG. 4, a bandpass modulated waveform is received by receiver 118, along with any interfering signals, to generate an input waveform 120. The receiver may be an antenna for example. This input waveform 120 is processed in analog processor 122 to produce a baseband waveform 124, which is then sampled by an analog-to-digital converter or sampler 126 to give a channel sequence 128. The channel sequence 128 is a sequence of digital values relating to the level of the baseband waveform 124 at sampling times. The levels need not be quantized to one bit. The channel sequence 128 is decoded by channel decoder 130 to produce an estimate 132 of the original data symbol and a reliability vector 134, associated with the data symbol. In this embodiment, the decoded data symbol 132 is passed to a digital processor 402, where the data symbol is used in other processes (such as decryption, source decoding etc.). The reliability vector 134 is passed to a controller 136 and used to generate one or more control signals 138 that are used to adjust various characteristics of the digital processor 402. For example, the one or more control signals 138 may be used to disable various processes performed by the digital processor 402 if the data symbol 132 is judged to be unreliable or incorrect. This, in turn, may be used to reduce power consumption by the digital processor 402. For example, the clock rate could be reduced if less processing is required, or the processor switched to a lower power mode. The channel decoder and the digital processor may be integrated, that is, the channel decoding may be performed as a process on the digital processor. Also, the controller may be integrated with the digital processor, so that some or all of the control functions are performed by the digital processor.

Those of ordinary skill in the art will recognize that the present invention has been described in terms of exemplary embodiments. However, the present invention could be implemented using hardware component equivalents such as special purpose hardware and/or dedicated processors, which are equivalents to the invention as, described and claimed. Similarly, general purpose computers, microprocessor based computers, digital signal processors, microcontrollers, dedicated processors, custom circuits, ASICS and/or dedicated hard wired logic may be used to construct alternative equivalent embodiments of the present invention.

The present invention, as described in embodiments herein, is broadly described above in flow chart form. However, those skilled in the art will appreciate that the processes described above can be implemented in any number of variations without departing from the present invention. For example, the order of certain operations carried out can often be varied, additional operations can be added or operations can be deleted without departing from the invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for recovering a data symbol from a communication signal, comprising:
    processing the communication signal to obtain a baseband waveform;
    sampling the baseband waveform to obtain a channel sequence;
    decoding the channel sequence to obtain an estimate of the data symbol and a measure of the reliability of the data symbol; and
    adjusting the processing of the communication signal dependent upon the measure of the reliability of the data symbol,
wherein processing the communication signal to obtain a baseband waveform comprises passing the communication signal through an amplifier and wherein adjusting the processing of the communication signal dependent upon the measure of the reliability of the data symbol comprises increasing the gain of the amplifier if the reliability of the data symbol is low and decreasing the gain of the amplifier if the reliability of the data symbol is high.

2. A method in accordance with claim 1, wherein decoding the channel sequence comprises passing the channel sequence through a turbo-decoder.

3. A method in accordance with claim 1, wherein the channel sequence is derived from the data symbol by turbo-coding.

4. A method in accordance with claim 1, wherein processing the communication signal to obtain a baseband waveform further comprises passing the communication signal through a filter, the method further comprising adjusting a frequency characteristic of the filter dependent upon the reliability of the data symbol.

5. A method in accordance with claim 1, wherein adjusting the gain of the amplifier dependent upon the measure of the reliability of the data symbol comprises comparing elements of a reliability vector to a predetermined limit.

6. A method for recovering a data symbol from a communication signal, comprising:
- processing the communication signal to obtain a baseband waveform;
- sampling the baseband waveform to obtain a channel sequence;
- decoding the channel sequence to obtain an estimate of the data symbol and a measure of the reliability of the data symbol; and
- adjusting the processing of the communication signal dependent upon the measure of the reliability of the data symbol, wherein processing the communication signal to obtain a baseband waveform comprises passing a signal derived from the communication signal through an amplifier and wherein adjusting the processing of the communication signal dependent upon the measure of the reliability of the data symbol comprises increasing the gain of the amplifier if the reliability of the data symbol is low and decreasing the gain of the amplifier if the reliability of the data symbol is high.

7. A method in accordance with claim 6, wherein decoding the channel sequence comprises passing the channel sequence through a turbo-decoder.

8. A method in accordance with claim 6, wherein the channel sequence is derived from the data symbol by turbo-coding.

9. A method in accordance with claim 6, wherein processing the communication signal to obtain a baseband waveform further comprises passing the communication signal through a filter, the method further comprising adjusting a frequency characteristic of the filter dependent upon the reliability of the data symbol.

10. A method in accordance with claim 6, wherein adjusting the gain of the amplifier dependent upon the measure of the reliability of the data symbol comprises comparing elements of a reliability vector to a predetermined limit.

11. A method for recovering a data symbol from a communication signal, comprising:
- processing the communication signal by passing it through an amplifier and then a demodulator to obtain a baseband waveform;
- sampling the baseband waveform to obtain a channel sequence;
- decoding the channel sequence to obtain an estimate of the data symbol and a measure of the reliability of the data symbol; and
- adjusting the gain of the amplifier dependent upon the measure of the reliability of the data symbol, wherein processing the communication signal to obtain a baseband waveform comprises receiving the communication signal from an antenna the method further comprising adjusting the orientation of the antenna dependent upon the reliability of the data symbol.

12. A communication system, comprising:
- an analog processor, comprising an amplifier, a filter and a demodulator, operable to receive an input communication signal and produce a baseband modulated signal;
- a sampler operable to receive the baseband modulated signal and produce a channel sequence;
- a decoder operable to receive the channel sequence and obtain an estimate of a data symbol and a measure of the reliability of the data symbol; and
- a controller operable to adjust the gain of the amplifier in response to the measure of the reliability of the data symbol, wherein the controller is operable to increase the gain of the amplifier when the reliability is low and to decrease the gain of the amplifier when the reliability is high.

13. A communication system in accordance with claim 12, wherein the controller is operable to adjust a frequency characteristic of the filter.

14. A communication system in accordance with claim 12, wherein the decoder comprises a forward error corrector and wherein the measure of reliability is produced by the forward error corrector.

15. A communication system in accordance with claim 12, wherein the decoder comprises a turbo-decoder.

* * * * *